Dec. 6, 1960 E. W. ROHRBACHER 2,963,111
AIR CLEANER SILENCER ASSEMBLY
Filed Feb. 18, 1957 2 Sheets-Sheet 1
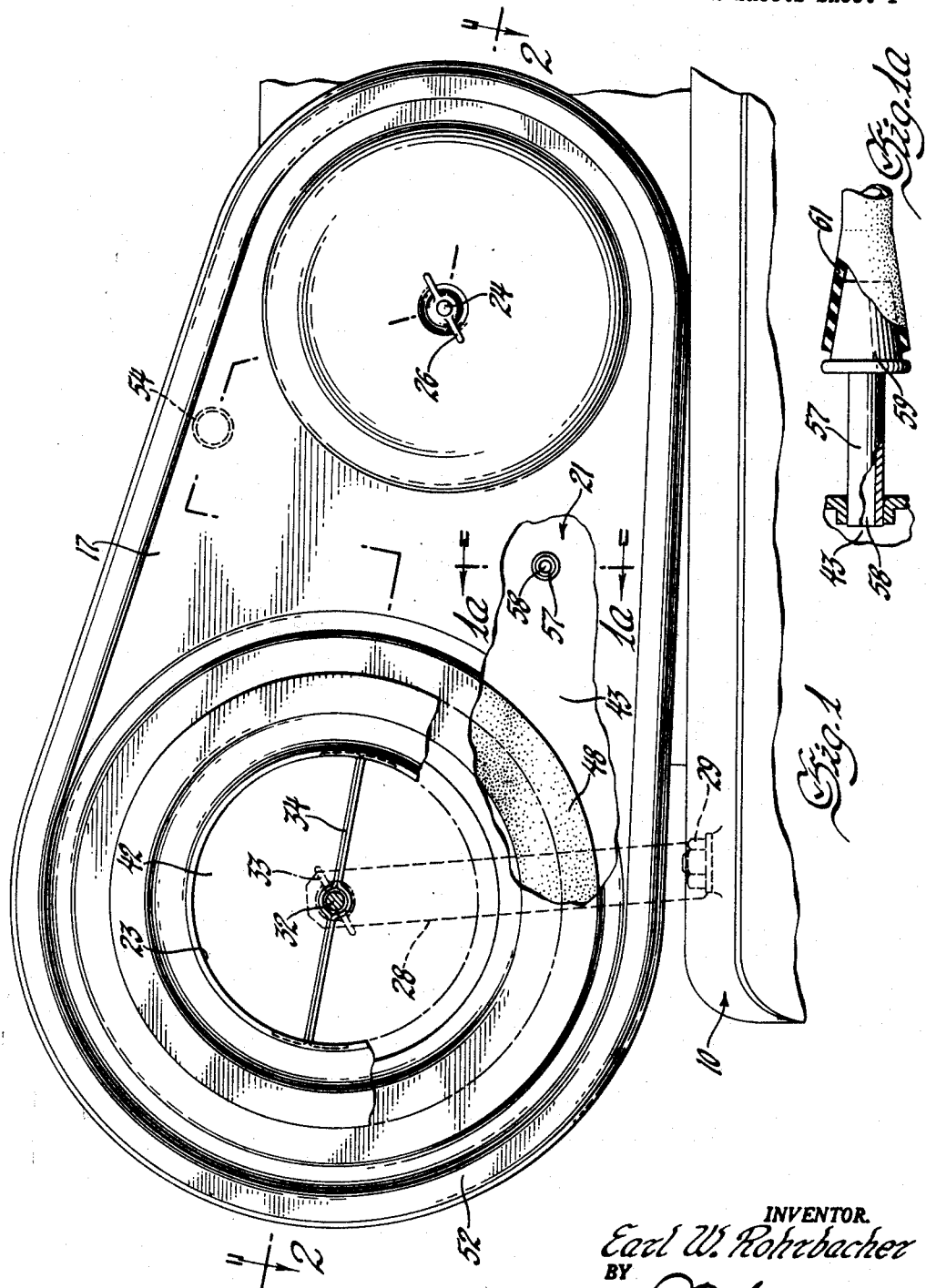
INVENTOR.
Earl W. Rohrbacher
BY
L. D. Burch
ATTORNEY

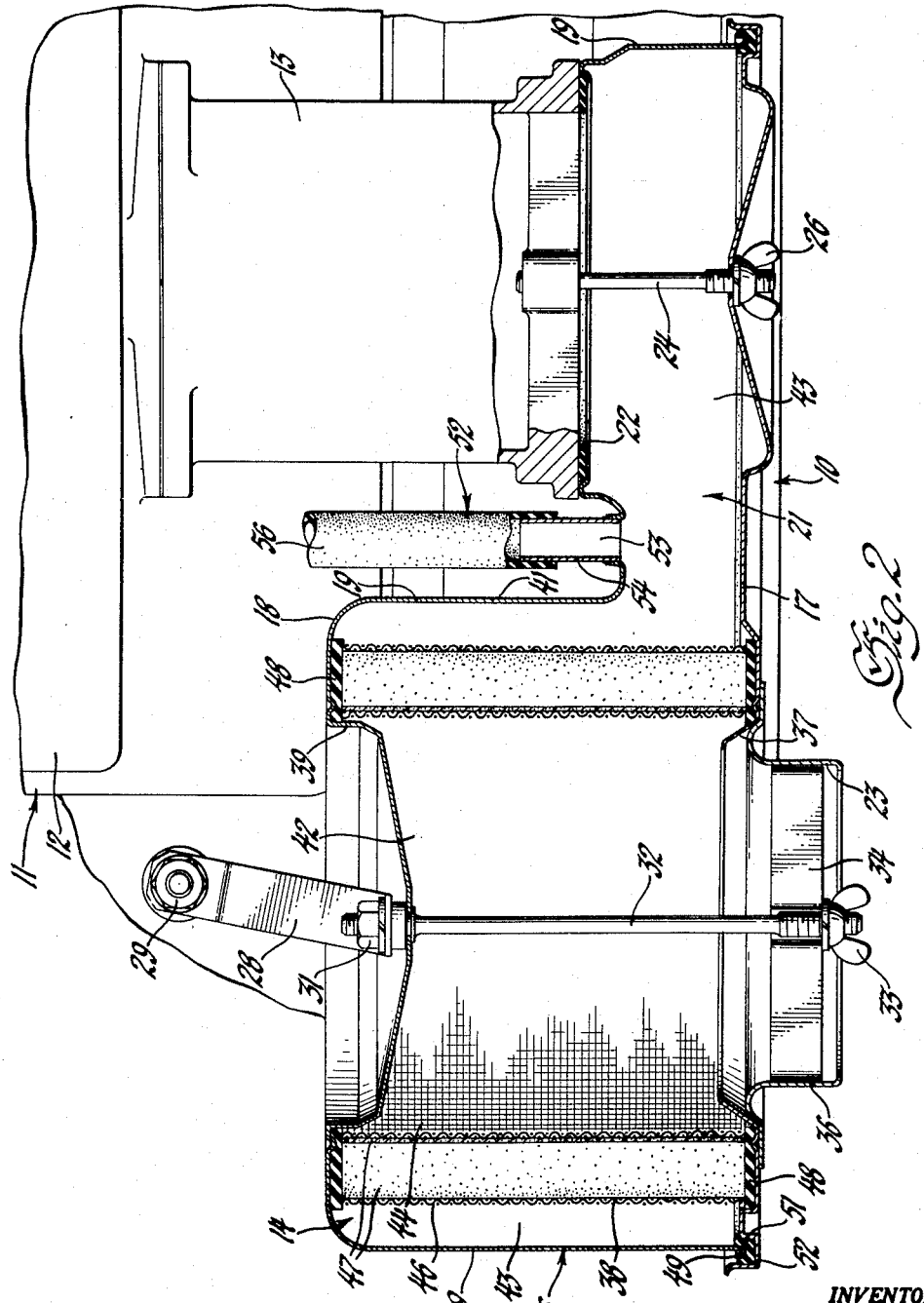

United States Patent Office 2,963,111
Patented Dec. 6, 1960

2,963,111

AIR CLEANER SILENCER ASSEMBLY

Earl W. Rohrbacher, Birmingham, Mich., assignor to General Motors Corporation, Detroit, Mich., a corporation of Delaware Filed Feb. 18, 1957, Ser. No. 640,867

3 Claims. (Cl. 183—44)

This invention relates to cleaner silencer assemblies for use with internal combustion engines and the like and has particular relation to cleaner silencer assemblies especially applicable for use with V-type fuel injection engines for automotive and other purposes.

It is proposed to provide a cleaner silencer assembly suitable for use with an engine induction system having a horizontal air inlet extending laterally from one side of the upper part of the induction system of the engine. This arrangement provides a relatively large space on either side of the inlet in which a part of the casing of the assembly may be located without materially increasing the width of the upper part of the engine. The casing of the assembly embodies a replaceable annular filter which divides the elongated chamber within the casing into an inlet chamber and an outlet chamber, the outlet chamber being formed to extend around the outside of the filter and to communicate with the induction system inlet. The inlet chamber is within the filter and communicates with the atmosphere through an inlet formed in the side of the casing opposite the outlet. The end of the casing containing the filter is enlarged and extends toward the induction system of the engine at one side of the induction system inlet. The opposite end of the casing is relatively narrow and shallow adjacent the induction system inlet. The elongated chamber within the casing and the inlet leading to the casing may be tuned to attenuate sounds emanating from the induction system of the engine.

In the drawing:

Figure 1 is a fragmentary side elevational view of an engine having a cleaner silencer assembly embodying the invention installed on the inlet to the induction system of the engine.

Figure 1a is an enlarged fragmentary view of an exhaust connection embodied in the structure disclosed by Figure 1.

Figure 2 is a fragmentary plan view of the structure shown by Figure 1 with the cleaner silencer assembly being shown in cross section substantially on line 2—2 of Figure 1, looking in the direction of the arrows.

The engine 10 embodying the invention is a V-type 8-cylinder internal combustion engine for automotive and other uses. The engine 10 has induction system means 11 including a manifold 12 extending lengthwise of the engine between the banks of cylinders of the engine and from the middle of which projects a horizontally disposed induction system inlet 13. The induction system means 11 may be of any suitable type or design, such as the fuel injection system disclosed in applications of John Dolza S.N. 608,853, filed September 10, 1956, and S.N. 608,893, filed September 10, 1956, now Patents No. 2,843,098 and No. 2,860,859, respectively. The cleaner silencer assembly 14 embodied in the engine 10 is especially applicable for use with the air induction means 11, although assembly 14 may be employed with any engine or in any other manner where the assembly may be found desirable. The assembly 14 embodies a casing 16 formed by end walls 17 and 18 and side walls 19. The end walls 17 and 18 are spaced to provide an elongated chamber 21 having an outlet 22 formed in the end wall 18 at one end of the chamber and an inlet 23 formed in the end wall 17 at the opposite end of the chamber. The outlet 22 is connected to the induction system inlet 13 by a bolt 24 which extends from the inlet across the chamber 21 and through the wall 17. The threaded end of the bolt 24 beyond the wall 17 is engaged by wing nut 26 which may be tightened against the wall 17 to secure the outlet end of the casing in place. The inlet end of the casing is supported by a bracket 28 bolted to the engine 10 at 29 and secured by nut 31 to the end of a bolt 32 projecting through the end wall 18. The opposite end of the bolt 32 is secured by a wing nut 33 in a bridge 34 extending across the inlet 23 between the side walls of a tubular extension 36 secured to and forming a part of the end wall 17. The end wall 17 is provided with an inwardly flanged edge adjacent the extension 36 which provides a locating shoulder 37 for the outer end of an annular filter 38 disposed within the chamber 21. The opposite end of the filter also engages a locating shoulder 39 formed in the end wall 18. The end wall 18 also is formed to provide an extension 41 at the end of the casing 16 opposite the inlet 23. The extension 41 projects inwardly of the engine in parallel relation to and at one side of the induction system inlet 13 and toward the manifold 12 of the induction system means 11. The extension 41 encloses one end of the filter 38 and a greater part of the chamber 21. The space within the filter 38 forms an inlet chamber 42 which communicates with the inlet 23 and supplies air to the inner surface of the filter 38. The exterior surface of the filter 38 is spaced from the side walls 19 of the casing throughout the extension 41 and elsewhere within the casing 16, to provide an outlet chamber 43 communicating with the outlet 22. The filter 38 may be constructed in any suitable manner but in the present instance the filter embodies inner and outer walls of screen wire, 44 and 46 respectively, between which a pleated paper filter element 47 is secured. The ends of the screens 44 and 46 and the pleated filter element 47 are embedded in resilient plastic end walls 48 which are adapted to be compressed between the walls 17 and 18 when the wing nut 33 is tightened on the bolt 32. The wing nuts 33 and 26 also secure the wall 17 to the remaining walls of the casing. This is accomplished by providing a beaded edge 49 on the side walls 19 which is adapted to engage a resilient gasket 51 secured in channel 52 formed around the edge of the wall 17. When the wing nuts 33 and 26 are tightened they secure the wall 17 in place and at the same time secure the casing 16 to the engine 10.

In order to utilize the outlet chamber 43 as a supply for clean air not effected by the throttle of the engine it is proposed to provide a secondary outlet in a wall of the casing 16 beyond the filter 38. The passage 53 is formed in a tube 54 secured in an opening in the wall 18 between the extension 41 and the outlet 22. A flexible hose 56 may be attached to the tube 54 for supplying air to the fuel inlets for the induction system 11. The chamber 43 also may be employed as an exhaust chamber for fuel vapors that it may be desirable to exhaust from the induction system means 11. This is accomplished by securing a tube 57 at any suitable location in an opening in the wall 18 to provide an exhaust passage 58 communicating with the chamber 43. A coupling 59 on the end of the tube 57 may be employed to connect a hose 61 to the chamber 43. The opposite end of the hose 61 may be connected to any part of the fuel system embodied in the induction system 11.

The elongated chamber 21 which includes the inlet and outlet chambers 42 and 43 respectively, provides an acoustical expansion chamber which may be varied in size to provide any desired acoustical capacitance. The inlet 23 also may be varied in length and cross section to provide an inlet passage having any desired acoustical impedance. The inlet 23 and the chamber 21 may therefore constitute low-pass filter means that may be tuned to attenuate sounds emanating from the induction system inlet 13.

The filter 38 may be removed and cleaned or replaced by a new filter by removing the wall 17.

I claim:

1. A cleaner silencer assembly for an internal combustion engine and the like comprising, a casing having end walls and side walls and providing an elongated chamber extending lengthwise between said end walls, said chamber having an air inlet at one end in one of said end walls and having an air outlet at the other end in the other of said end walls, means for securing said casing to an internal combustion engine with said air outlet connected to the induction system for said engine, an annular filter in said chamber and extending across the space between said end walls at said one end of said chamber and at one side of said air outlet and around said air inlet and providing an air inlet chamber within said filter and communicating with said air inlet, said side walls of said casing being spaced from said filter and providing an air outlet chamber around said filter and communicating with said air outlet, each of said end walls being formed to provide a filter locating shoulder thereon, one of said end walls being removable to expose said filter and said elongated chamber, said one of said end walls being a wall of said casing supporting one end of said filter and extending throughout the length of said casing enclosing the end of said casing opposite said air outlet and including said air inlet, one of said end walls of said casing having a secondary air outlet means adapted to be connected to the induction system of said engine at a point so as to provide a supply of clean air not effected by the throttle of the engine, said casing at one side of said air outlet being formed to provide an extension in said other of said end walls and projecting laterally of said air outlet and parallel to the direction of air flow within said outlet and enclosing one end of said filter and a substantial part of said elongated chamber.

2. A cleaner silencer assembly for an internal combustion engine and the like comprising, a casing having end walls and side walls and providing an elongated chamber extending lengthwise between said end walls, said chamber having an air inlet at one end in one of said end walls and having an air outlet at the other end in the other of said end walls, means for securing said casing to an internal combustion engine with said air outlet connected to the induction system for said engine, an annular filter in said chamber and extending across the space between said end walls at said one end of said chamber and at one side of said air outlet and around said air inlet and providing an air inlet chamber within said filter and communicating with said air inlet, said side walls of said casing being spaced from said filter and providing an air outlet chamber around said filter and communicating with said air outlet, each of said end walls being formed to provide a filter locating shoulder thereon, one of said end walls being removable to expose said filter and said elongated chamber, said one of said end walls being a wall of said casing supporting one end of said filter and extending throughout the length of said casing enclosing the end of said casing opposite said air outlet and including said air inlet, one of said end walls of said casing having an exhaust passage means adapted to be connected to the fuel system of said engine, said casing at one side of said air outlet being formed to provide an extension in said other of said end walls and projecting laterally of said air outlet and parallel to the direction of air flow within said outlet and enclosing one end of said filter and a substantial part of said elongated chamber.

3. A cleaner silencer assembly for an internal combustion engine and the like comprising, a casing having end walls and side walls and providing an elongated chamber extending lengthwise between said end walls, said chamber having an air inlet at one end in one of said end walls and having an air outlet at the other end in the other of said end walls, means for securing said casing to an internal combustion engine with said air outlet connected to the induction system for said engine, an annular filter in said chamber and extending across the space between said end walls at said one end of said chamber and at one side of said air outlet and around said air inlet and providing an air inlet chamber within said filter and communicating with said air inlet, said side walls of said casing being spaced from said filter and providing an air outlet chamber around said filter and communicating with said air outlet, each of said end walls being formed to provide a filter locating shoulder thereon, one of said end walls being removable to expose said filter and said elongated chamber, said one of said end walls being a wall of said casing supporting one end of said filter and extending throughout the length of said casing enclosing the end of said casing opposite said air outlet and including said air inlet, one of said end walls of said casing having a secondary air outlet means adapted to be connected to the induction system of said engine at a point so as to provide a supply of clean air not effected by the throttle of the engine and an exhaust passage means adapted to be connected to the fuel system of said engine, said casing at one side of said air outlet being formed to provide an extension in said other of said end walls and projecting laterally of said air outlet and parallel to the direction of air flow within said outlet and enclosing one end of said filter and a substantial part of said elongated chamber.

References Cited in the file of this patent

UNITED STATES PATENTS

| | | |
|---|---|---|
| 1,005,386 | Whiting | Oct. 10, 1911 |
| 1,693,741 | Wuest | Dec. 4, 1928 |
| 1,968,016 | Dabadie | July 31, 1934 |
| 2,069,379 | Moe | Feb. 2, 1937 |
| 2,340,152 | Steenson | Jan. 25, 1944 |
| 2,349,676 | Pratt | May 23, 1944 |
| 2,474,017 | Smith et al. | June 21, 1949 |
| 2,732,031 | Rabbitt et al. | Jan. 24, 1956 |
| 2,788,086 | Sebok | Apr. 9, 1957 |

FOREIGN PATENTS

| | | |
|---|---|---|
| 160,363 | Great Britain | Mar. 24, 1921 |
| 1,109,454 | France | Sept. 28, 1955 |
| 1,115,158 | France | Dec. 26, 1955 |